(12) United States Patent
Manica et al.

(10) Patent No.: US 12,139,369 B2
(45) Date of Patent: Nov. 12, 2024

(54) SMART BEAMFORMING FOR RELIABLE AND SECURE WIRELESS DATA TRANSMISSIONS

(71) Applicant: Otis Elevator Company, Farmington, CT (US)

(72) Inventors: Luca Manica, Riva del Garda (IT); Enrico Manes, Feeding Hills, MA (US); Valerio Senni, Rome (IT); Marco Rocchetto, Verona (IT); Davide Martintoni, Trentino-Alto Adige (IT); Giacomo Gentile, Bologna (IT); Goran Djuknic, New York, NY (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1370 days.

(21) Appl. No.: 16/711,624

(22) Filed: Dec. 12, 2019

(65) Prior Publication Data

US 2020/0189876 A1 Jun. 18, 2020

Related U.S. Application Data

(60) Provisional application No. 62/779,497, filed on Dec. 14, 2018.

(51) Int. Cl.
*B66B 1/34* (2006.01)
*H04B 7/06* (2006.01)
(Continued)

(52) U.S. Cl.
CPC .......... *B66B 1/3453* (2013.01); *B66B 1/3461* (2013.01); *B66B 1/3492* (2013.01);
(Continued)

(58) Field of Classification Search
CPC ....... H04B 7/06; H04B 7/0617; H04W 12/04; H04W 12/10; H04W 16/24; H04W 16/28;
(Continued)

(56) References Cited

U.S. PATENT DOCUMENTS 6,895,218 B2 * 5/2005 Yarkosky ............. H04B 7/2606
455/7
7,710,319 B2 5/2010 Nassiri-Toussi et al.
(Continued)

FOREIGN PATENT DOCUMENTS

CN 101427418 A * 5/2009 ................ H01P 1/18
CN 103141130 A 6/2013
(Continued)

OTHER PUBLICATIONS

Bestbuydns. Wireless Solution for Elevator CCTV System 888.675. 0088—YouTube. Published on Apr. 4, 2011. Retrieved Nov. 20, 2018 from https://www.youtube.com/watch?v=v6tScltGxwY.
(Continued)

*Primary Examiner* — Quochien B Vuong
(74) *Attorney, Agent, or Firm* — CANTOR COLBURN LLP

(57) ABSTRACT

Provided are embodiments including a system a method for performing smart beamforming for reliable and secure wireless data transmission. The can embodiments include receiving at least one parameter of an elevator car operating in a hoistway, and determining a steering angle based on the received parameters. The embodiments can also include performing beamforming of an antenna array based on the determined steering angle, and transmitting data from the antenna array based at least in part on a beamforming process.

19 Claims, 4 Drawing Sheets

(51) Int. Cl.
*H04W 12/10* (2021.01)
*H04W 16/28* (2009.01)
*H04W 84/18* (2009.01)

(52) U.S. Cl.
CPC .......... *H04B 7/0617* (2013.01); *H04W 12/10* (2013.01); *H04W 16/28* (2013.01); *H04W 84/18* (2013.01)

(58) Field of Classification Search
CPC .... H04W 24/00; H04W 24/02; B66B 1/3453; B66B 1/3462; B66B 1/3492
See application file for complete search history.

(56) References Cited

U.S. PATENT DOCUMENTS

| | | | |
|---|---|---|---|
| 8,238,835 B2 | 8/2012 | Nagai et al. | |
| 9,088,312 B2 | 7/2015 | Rahman et al. | |
| 9,203,497 B2 | 12/2015 | Kim et al. | |
| 9,736,699 B1 | 8/2017 | Rao | |
| 9,780,856 B2 | 10/2017 | Cai | |
| 10,023,440 B2 | 7/2018 | Qi et al. | |
| 10,703,606 B2 * | 7/2020 | Salmikuukka | B66B 11/0226 |
| 2002/0044096 A1 | 4/2002 | Chung | |
| 2006/0244675 A1 | 11/2006 | Elliot et al. | |
| 2013/0295944 A1 | 11/2013 | Saur et al. | |
| 2017/0174471 A1 | 6/2017 | Salmikuukka et al. | |
| 2018/0302136 A1 | 10/2018 | Wigren et al. | |

FOREIGN PATENT DOCUMENTS

| | | | | |
|---|---|---|---|---|
| CN | 104486775 A * | 4/2015 | | H04W 16/28 |
| CN | 206290288 U | 6/2017 | | |
| CN | 107000973 A | 8/2017 | | |
| JP | 2015224117 A | 12/2015 | | |
| WO | 2012014222 A1 | 2/2012 | | |
| WO | 2015024988 A1 | 2/2015 | | |
| WO | WO-2017085238 A1 * | 5/2017 | | B66B 1/3492 |
| WO | 2017198907 A1 | 11/2017 | | |

OTHER PUBLICATIONS

CCTV Camera Pros. Elevator Security Camera with Wireless CCTV Transmission System—YouTube. Published Feb. 23, 2015. Retrieved Nov. 20, 2018 from https://www.youtube.com/watch?v=seTxiwl_VUc. 35 Pages.
Innovative wireless solution. WLS-300E. Laser optical video transmission system. Exelon Technology. Retrieved Novmeber 21, 2018 from www.versiton.com/img/elevator_WLS300E_Exelon.pdf. 4 Pages.
Loken et al. "Camera Interaction in Elevator Environment", Division of Product Development | Department of Design Sciences. Faculty of Engineering LTH | Lund University. 2018. Master Thesis. 168 Pages.
Roca, F. "Design of Cost-Effective Wireless Networks in High-Density Enclosures", Upf, Retrieved Nov. 21, 2018 from https://repositori.upf.edu/bitstream/handle/10230/25303/Wilhelmi_2015.pdf?sequence=1&isAllowed=y, 97 Pages.
Summers, A. "Cisco Wireless Equip Elevator Solution". Published Jan. 15, 2015 on Linkedin. Retrieved Nov. 21, 2018 from https://www.linkedin.com/pulse/cisco-wireless-equip-elevator-solution-andrew-hall-summers/. 9 pages.
Vemuru, B. "Transmit Smart with Transmit Beamforming", Marvell, Nov. 2011, Retrieved from www.marvell.com, 8 pages.
Yuvaraju et al. "Smart Wireless Elevaotr Design", International Journal of Research in Electrical & Electronics Engineering, vol. 3, Issue 3, Jul.-Sep. 2015, pp. 24-27.
Office Action issued Oct. 20, 2021 for Chinese Application No. 201911282333.7.

* cited by examiner

SMART BEAMFORMING FOR RELIABLE AND SECURE WIRELESS DATA TRANSMISSIONS

CROSS-REFERENCE TO RELATED APPLICATIONS

This application claims the benefit of U.S. Application No. 62/779,497 filed Dec. 14, 2018, which is incorporated herein by reference in its entirety.

BACKGROUND

The present invention relates to performing smart beamforming for reliable and secure wireless data transmission, and more specifically to performing smart beamforming for reliable and secure wireless data transmission in elevator systems.

In today's environment, wireless communication can be susceptible to interference from a variety of sources. In an elevator system, some passengers may experience reduced connectivity or loss of connectivity to the wireless network due to the interference caused by the elevator car structure and other objects. There may be a need to optimize the wireless link reliability and security in communication systems for the next generation of elevator systems.

SUMMARY

According to an embodiment, a system for performing smart beamforming for reliable and secure wireless data transmission is provided. The system includes a controller operably coupled to one or more sensors, wherein the one or more sensors are configured to monitor at least one parameter of an elevator car in a hoistway, and a first communication node including a first antenna array that is configured to communicate with a second communication node. The system can also include a beamforming control module operably coupled to the first communication node, and the one or more sensors, wherein the beamforming control module is configured to determine a steering angle for one or more antenna of the first antenna array.

In addition to one or more of the features described herein, or as an alternative, further embodiments can include a second communication node that includes a second antenna array and is operably coupled to the beamforming control module, wherein the beamforming control module is configured to determine a steering angle for one or more antenna of the second antenna array.

In addition to one or more of the features described herein, or as an alternative, further embodiments can include at least one parameter that indicates at least one of a position of the elevator car in the hoistway or a speed of the elevator car.

In addition to one or more of the features described herein, or as an alternative, further embodiments can include a steering angle that is calculated as a function of the position of the elevator car in the hoistway.

In addition to one or more of the features described herein, or as an alternative, further embodiments include a steering angle that is calculated as a function of the speed of the elevator car.

In addition to one or more of the features described herein, or as an alternative, further embodiments can include achieving the steering angle by electronically steering one or more antenna in the first antenna array or the second antenna array based on the steering angle.

In addition to one or more of the features described herein, or as an alternative, further embodiments can include achieving the steering angle by mechanically steering one or more antenna in the first antenna array or the second antenna array based on the steering angle.

In addition to one or more of the features described herein, or as an alternative, further embodiments can include a plurality of antenna arrays, where the antenna arrays are distributed along a hoistway.

In addition to one or more of the features described herein, or as an alternative, further embodiments can include performing the beamforming as the elevator car travels in the hoistway.

In addition to one or more of the features described herein, or as an alternative, further embodiments can include a beamforming control module that is located in at least one of the controller, the first communication node, or the second communication node.

According to another embodiment, a method for performing smart beamforming for reliable and secure wireless data transmission is provided. The method includes receiving at least one parameter of an elevator car operating in a hoistway, and determining a steering angle based on the at least one parameter. The method can also include performing beamforming of a first antenna array based on the determined steering angle, and transmitting data from the first antenna array based at least in part on beamforming.

In addition to one or more of the features described herein, or as an alternative, further embodiments can include performing beamforming for a second antenna array based on the at least one parameter, and transmitting data from the second antenna array to the first antenna array based on the at least one parameter In addition to one or more of the features described herein, or as an alternative, further embodiments can include using at least one parameter that indicates at least one of a position of the elevator car in the hoistway or a speed of the elevator car.

In addition to one or more of the features described herein, or as an alternative, further embodiments can include calculating a steering angle as a function of the position of the elevator car in the hoistway.

In addition to one or more of the features described herein, or as an alternative, further embodiments can include calculating a steering angle as a function the speed of the elevator car In addition to one or more of the features described herein, or as an alternative, further embodiments can include beamforming that is performed by electronically steering one or more antenna in the first antenna array or the second antenna array based on the steering angle.

In addition to one or more of the features described herein, or as an alternative, further embodiments can include beamforming that is performed by mechanically steering one or more antenna in the first antenna array or one or more antenna in the second antenna array.

In addition to one or more of the features described herein, or as an alternative, further embodiments can include updating the beamforming for the first antenna array and the second antenna array as the elevator car travels in the hoistway.

In addition to one or more of the features described herein, or as an alternative, further embodiments can include determining the steering angle is executed in at least one of an elevator controller configured to control the elevator car, an access point including a first antenna array, or a communication node including a second antenna array.

In addition to one or more of the features described herein, or as an alternative, further embodiments can include arranging a plurality of antenna arrays in the hoistway.

Technical effects of embodiments of the present disclosure include improving the wireless communication quality and reliability by performing optimized beamforming techniques.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

As elevators transition from wired communication arrangements between the elevator car and the station elevator equipment to a wireless communication architecture, the quality and security of the wireless communication channels should be considered. In some wireless communication systems, omnidirectional antennas are used for communication. However, because omnidirectional antennas transmit signals in all directions they may suffer from increased power consumption and reduced signal quality. Transitioning to wireless connections presents new challenges for assuring the same level of safety, reliability, and security obtained when using the wired connection.

The techniques described herein utilize antenna arrays instead of omnidirectional antennas, and, thereby, improves the quality of the communication because it steers the main beam of the wireless signal towards the intended wireless receiver. In addition, the security is increased since the wireless data is spatially bounded in the main beam that is radiated from the transmitter. Thus, it is more difficult for any receiver other than the intended receiver to intercept the wireless signal, unless that other receiver has placed itself between the antenna and the intended receiver. The techniques described herein provide for a fast algorithm for steering angle computation for the antenna array leveraging apriori information about the environment where the communication system operates.

Figure 1:
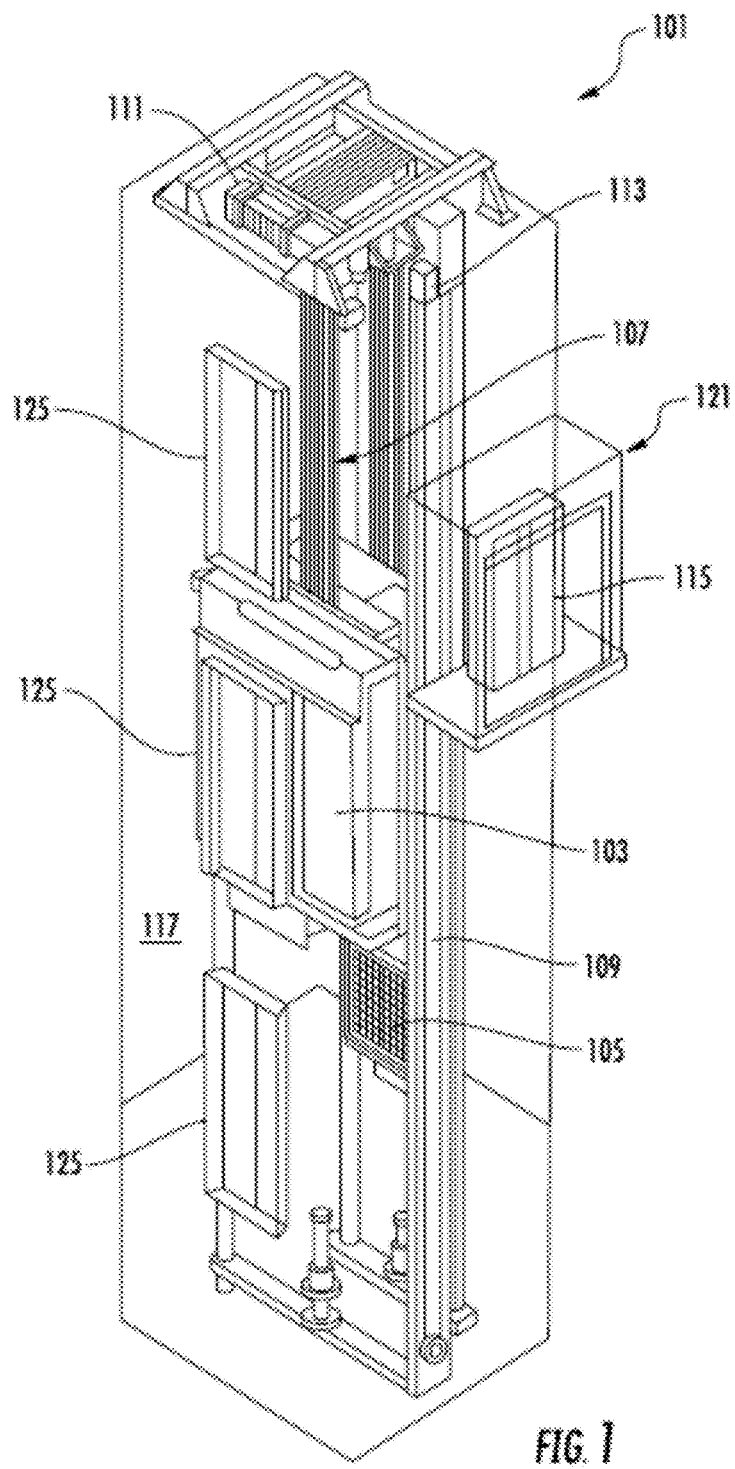
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
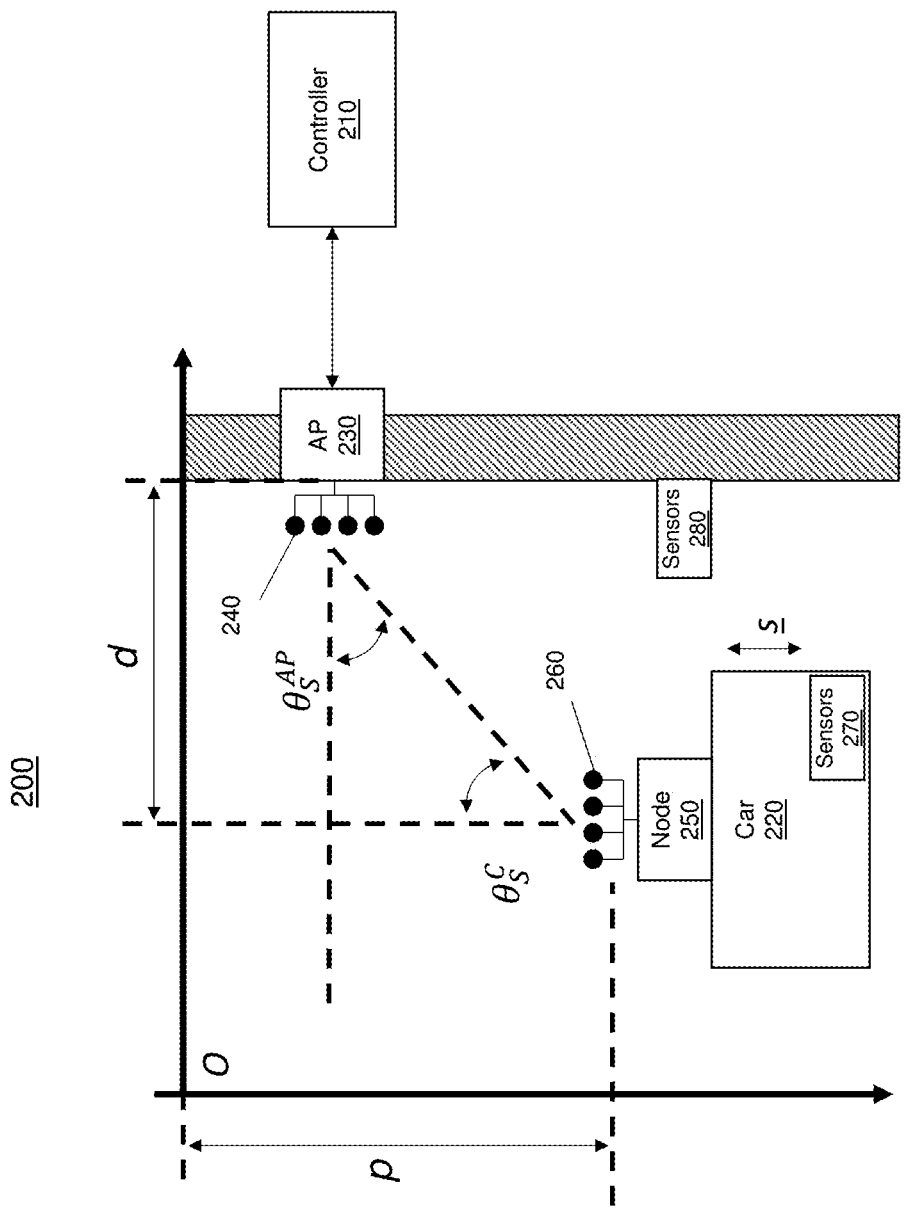
FIG. 2 depicts a system in accordance with one or more embodiments.

Now referring to FIG. 2, a system 200 for performing smart beamforming in accordance with one or more embodiments is shown. The system 200 includes a controller 210 such as that shown in FIG. 1. The controller 210 can be configured to wirelessly control the elevator car 220. The controller 210 can communicate using a first communication node such as an access point 230 having a first antenna array 240 and a second communication node 250 arranged on the elevator car 220 having a second antenna array 260. In some embodiments, the passengers in the elevator car 220 can access a network (not shown) using the communication node 250 and access points 230. In one or more embodiments, the communication nodes 230, 250 can be used for bidirectional communication or the communication nodes 230, 250 can operate in a transmission or receiving mode.

In one or more embodiments, the position of the elevator car 220 and the speed the elevator car 220 is traveling can be detected by one or more sensors 270, 280 that are operably coupled to the elevator car 220. Sensors 270, 280 can be positioned on the elevator car 220 or in the elevator hoistway. The sensors 270, 280 can be used to monitor one or more parameters of the elevator system to perform the beamforming process described below. In some embodiments, the beamforming control module 300, discussed with reference to FIG. 3, receives one or more parameters from an elevator controller 210. The beamforming control module 300 can calculate steering angles $\theta_S^C$ for the elevator car node 220 and the steering angle $\theta_S^{AP}$ for the access point 230. The beamforming control module 300 can determine the steering angles θ by determining the position p the elevator car 220 is in the hoistway and using a distance d the elevator car 220 is from the access point 230 where the origin O can be used as a reference point to perform the calculations. In one embodiment, the position p the elevator car 220 is in the hoistway may be determined by the elevator controller 210, a computing device on the elevator car 220, or by any desired method. In addition, the beamforming control module 300 can use the speed s which indicates the speed at which the elevator car 220 is traveling to adjust the beamforming as the elevator car 220 travels in the hoistway. In one or more embodiments, the beamforming is accomplished by phase-shifting one or more signals from the antenna array. In other embodiments, the antenna array can be manually or mechanically directed in a direction to achieve the steering angle.

Figure 3:
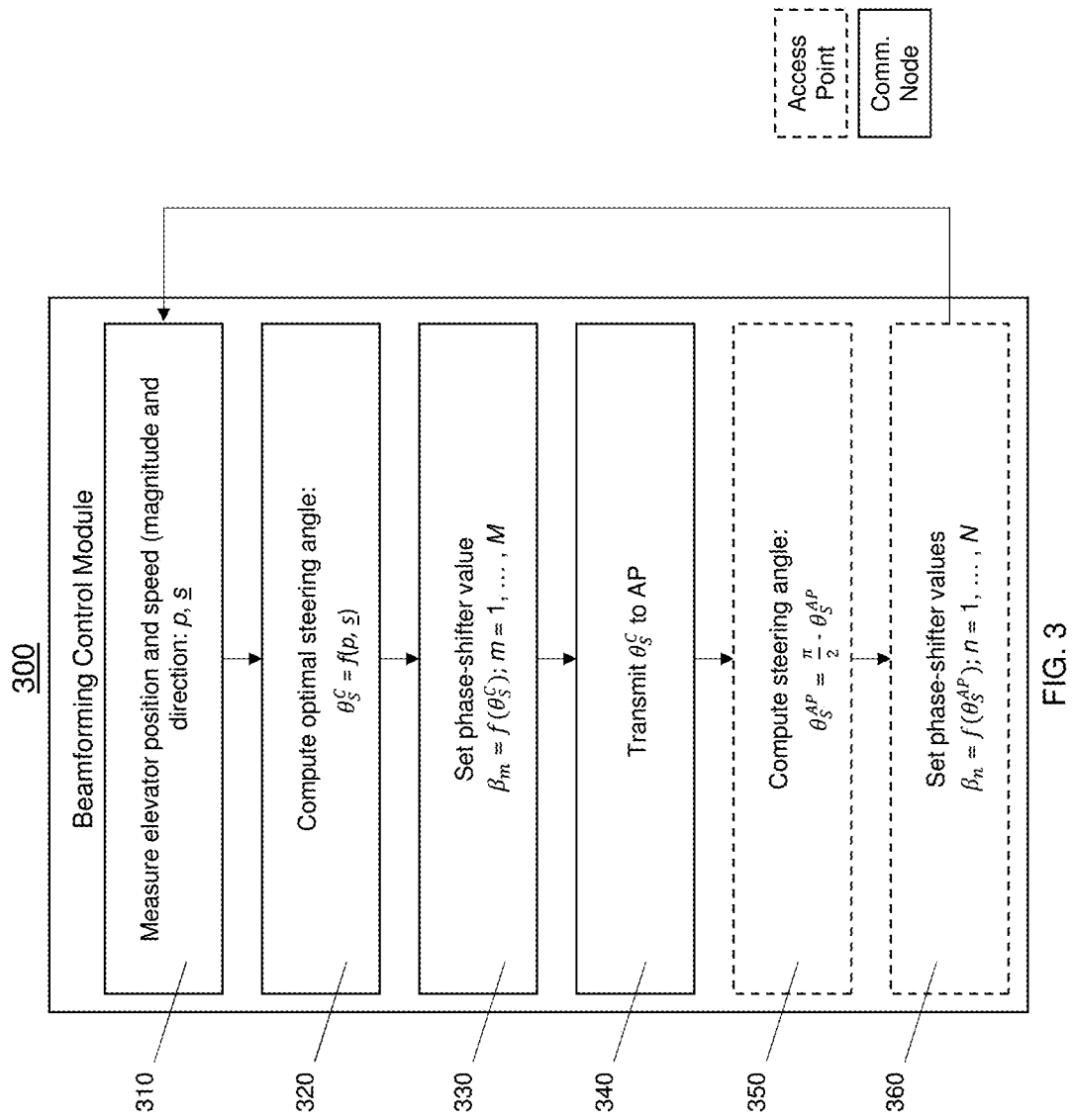
FIG. 3 depicts a flowchart for performing smart beamforming in accordance with one or more embodiments.

Now referring to FIG. 3, a beamforming control module 300 that is configured to calculate steering angles between one or more antenna arrays in accordance with one or more embodiments is shown. The beamforming control module 300 first measures the elevator position p and speed s to configure the steering angle $\theta_S^C$ the compute node 220 (block 310). The sensors 270, 280 can be used to perform the measurements or the measurements can be obtained from the elevator controller 210. Next, the optimal steering angle $\theta_S^C$ of the communication node 250 is calculated (block 320). In one or more embodiments, the optimal steering angle can be computed using trigonometry. Consider equation 1 which provides:

$$\theta_S^C = \arctan\left(\frac{d}{p'}\right) + \delta\theta_S^C(s) \quad \text{(Eq. 1)}$$

where d and p' are equal to the distance between the access point 230 and the antenna array 260 placed on top of the elevator car 220 along the x-direction and y-direction, respectively. Equation 1 is a non-limiting example for calculating the optimal steering angle. It should be understood that other formulas can be used for determining optimal steering angles such as those using multipath that can factor reflections of signals instead of using line-of-sight calculations. Moreover, fine tuning of the steering angle is performed using the elevator speed (magnitude and direction) or maximizing the received power using optimization techniques. As shown, the steering angle $\theta_S^C$ is a function of the position and speed. Next, the phase-shifter values $\beta_m$ are set for each antenna m of the antenna array 260 to perform the beamforming (block 330). The steering angle $\theta_S^{AP}$ is then transmitted to the access point 230 to calculate the steering angle $\theta_S^S$ (block 340). The steering angle $\theta_S^{AP}$ is equal to $$\frac{\Pi}{2} - \theta_S^C (350).$$

After the steering angle $\theta_S^C$ is determined, the phase-shifter values $\beta_n$ for each antenna of the antenna array 240 is set (block 360). In some embodiments, the beamforming control process flow is repeated to optimize the wireless communication. In one or more embodiments, the position of the elevator can be used to perform beamforming, while in other embodiments the speed parameter s of the elevator car 220 can be used to further optimize the configuration of the antenna arrays for communication. That is, incorporating the speed parameter s into the beamforming calculation can be optional. Also, in some embodiments the antenna arrays 240, 260 can perform beamforming process independent of one another.

Figure 4:
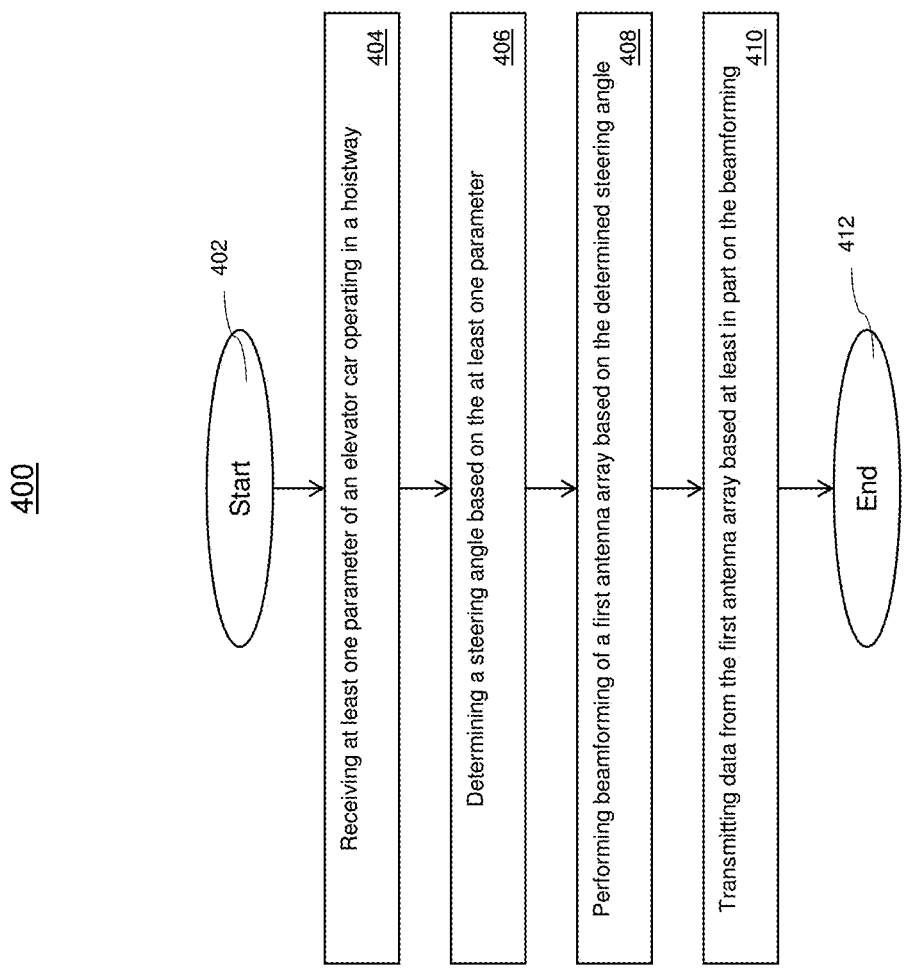
FIG. 4 depicts another flowchart for performing smart beamforming in accordance with one or more embodiments.

FIG. 4 depicts another flowchart of a method 400 for performing smart beamforming in an elevator system in accordance with one or more embodiments. The method 400 begins at block 402 and proceeds to block 404 which provides for receiving, by a beamforming control module, at least one parameter of an elevator car operating in a hoistway. Block 406 provides for determining a steering angle based on the at least one parameter. The method 400, at block 408 provides for performing beamforming of a first antenna array based on the determined steering angle. Block 410 provides for transmitting data from the first antenna array based at least in part on beamforming. The method 400 can end at block 412 or the steps 404-410 can be repeated to optimize the communication performance.

The technical effects and benefits include improving the communication reliability (better link quality) and security (more confined wireless signal) in next-generation elevators.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for performing smart beamforming for reliable and secure wireless data transmission, the system comprising:
    a controller operably coupled to one or more sensors, wherein the one or more sensors are configured to monitor at least one parameter of an elevator car in a hoistway;
    a first communication node including a first antenna array that is configured to communicate with a second communication node; and
    a beamforming control module operably coupled to the first communication node and the one or more sensors, wherein the beamforming control module is configured to determine a steering angle for one or more antenna of the first antenna array;
    wherein the second communication node includes a second antenna array and is operably coupled to the beamforming control module, wherein the beamforming control module is configured to determine a steering angle for one or more antenna of the second antenna array based on a determined steering angle of for one or more antenna of the first antenna array.

2. The system of claim 1, wherein the at least one parameter indicates at least one of a position of the elevator car in the hoistway or a speed of the elevator car.

3. The system of claim 2, wherein the steering angle is calculated as a function of the position of the elevator car in the hoistway.

4. The system of claim 3, wherein the steering angle is calculated as a function the speed of the elevator car.

5. The system of claim 1, wherein the steering angle is achieved by electronically steering one or more antenna in the first antenna array or the second antenna array based on the steering angle.

6. The system of claim 1, wherein the steering angle is achieved by mechanically steering one or more antenna in the first antenna array or the second antenna array based on the steering angle.

7. The system of claim 1, further comprising a plurality of antenna arrays, wherein the antenna arrays are distributed along a hoistway.

8. The system of claim 7, wherein the beamforming is performed as the elevator car travels in the hoistway.

9. The system of claim 1, wherein the beamforming control module is located in at least one of the controller, the first communication node, or the second communication node.

10. A method for performing smart beamforming for reliable and secure wireless data transmission, the method comprising:
    receiving, by a beamforming control module, at least one parameter of an elevator car operating in a hoistway;
    determining a steering angle based on the at least one parameter, wherein the first communication node is configured to communicate with a second communication node having a second antenna array;
    performing beamforming of a first antenna array based on the determined steering angle; and
    transmitting data from the first antenna array based at least in part on beamforming;
    wherein a steering angle for one or more antenna of the second antenna array is determined based on the determined steering angle for one or more antenna of the first antenna array.

11. The method of claim 10, further comprising performing beamforming for a second antenna array based on the at least one parameter; and
    transmitting data from the second antenna array to the first antenna array based on the at least one parameter.

12. The method of claim 11, wherein the at least one parameter indicates at least one of a position of the elevator car in the hoistway or a speed of the elevator car.

13. The method of claim 12, wherein the steering angle is calculated as a function of the position of the elevator car in the hoistway.

14. The method of claim 12, wherein the steering angle is calculated as a function the speed of the elevator car.

15. The method of claim 11, wherein beamforming is performed by electronically steering one or more antenna in the first antenna array or the second antenna array based on the steering angle.

16. The method of claim 11, wherein beamforming is performed by mechanically steering one or more antenna in the first antenna array or one or more antenna in the second antenna array.

17. The method of claim 11, further comprising updating the beamforming for the first antenna array and the second antenna array as the elevator car travels in the hoistway.

18. The method of claim 11, wherein determining the steering angle is executed in at least one of an elevator controller configured to control the elevator car, a first communication node including the first antenna array, or a second communication node including the second antenna array.

19. The method of claim 18, further comprising arranging a plurality of antenna arrays in the hoistway.

\* \* \* \* \*